United States Patent
McFarland et al.

(10) Patent No.: US 7,013,845 B1
(45) Date of Patent: Mar. 21, 2006

(54) EMISSIONS REDUCTION SYSTEM FOR AN INTERNAL COMBUSTION ENGINE

(75) Inventors: Steve McFarland, Arlington, TX (US); Wilbur Jones, Lakeport, TX (US)

(73) Assignee: HydroFuel Systems, Inc., Fort Worth, TX (US)

( * ) Notice: Subject to any disclaimer, the term of this patent is extended or adjusted under 35 U.S.C. 154(b) by 0 days.

(21) Appl. No.: 10/977,803

(22) Filed: Oct. 29, 2004

(51) Int. Cl.
*F02B 43/10* (2006.01)

(52) U.S. Cl. ......................................... 123/3; 123/25 R

(58) Field of Classification Search ............... 123/25 R, 123/25 A, 25 J, 25 K, 25 L, 25 M, 25 N, 123/25 Q, 3; 60/723, 749, 750; 431/170
See application file for complete search history.

(56) References Cited

U.S. PATENT DOCUMENTS

| | | | | | |
|---|---|---|---|---|---|
| 3,930,470 | A | * | 1/1976 | Douglas | 123/25 A |
| 4,173,450 | A | * | 11/1979 | Schrank | 431/190 |
| 4,476,817 | A | * | 10/1984 | Lindberg | 123/3 |
| 4,502,420 | A | * | 3/1985 | Mezger | 123/25 C |
| 4,541,383 | A | * | 9/1985 | Jessel | 123/435 |
| 4,708,118 | A | * | 11/1987 | Rawlings | 123/555 |
| 4,800,848 | A | * | 1/1989 | Hubbard | 123/25 E |
| 5,084,216 | A | * | 1/1992 | Ogura et al. | 261/18.2 |
| 5,694,908 | A | * | 12/1997 | Hsu | 123/637 |
| 6,505,579 | B1 | * | 1/2003 | Lee | 123/25 A |
| 6,756,140 | B1 | * | 6/2004 | McAlister | 429/20 |
| 6,919,062 | B1 | * | 7/2005 | Vasileiadis et al. | 423/437.1 |
| 6,929,878 | B1 | * | 8/2005 | Chen et al. | 429/100 |

* cited by examiner

*Primary Examiner*—Henry C. Wen
*Assistant Examiner*—Jason Benton

(57) ABSTRACT

A dual system for overall engine emissions control, including prevention of excessive formation of nitrogen oxides and carbon compounds 1) by cooling and humidifying intake air and 2) by restructuring and modifying hydrocarbon fuels, resulting in a more complete combustion, a significant reduction of the latent heat of combustion and increased combustion potency. The invention utilizes one or more ultrasonic devices to create an aqueous vapor from an ultra-pure water supply, said vapor varying in quantity according to engine size and load, having electronic sensors and controls for precision switching, metering and delivery. Simultaneously, while humidifying the intake air, the hydrocarbon fuel is passed from a fuel supply through a catalytic reactor to restructure the hydrocarbon molecules into a more homogeneous, more combustible and cleaner-burning fuel. Thus equipped, said internal combustion engine can be run as a fuel conserving, low emissions prime mover.

29 Claims, 2 Drawing Sheets

EMISSIONS REDUCTION SYSTEM FOR AN INTERNAL COMBUSTION ENGINE

REFERENCES CITED

| Document | Inventor | Issue Date | Classification |
|---|---|---|---|
| U.S. Pat. No. 1,777,554 | Ducloux | October 1930 | 123/3 |
| U.S. Pat. No. 2,136,170 | Luertzing | November 1938 | 210/205 |
| U.S. Pat. No. 2,231,605 | Stephenson | February 1941 | 123/122 |
| U.S. Pat. No. 3,059,910 | Moriya | October 1962 | 261/72 |
| U.S. Pat. No. 3,383,560 | Ginsburgh | May 1968 | 317/2 |
| U.S. Pat. No. 3,597,668 | Yoshimine | August 1971 | 317/262 |
| U.S. Pat. No. 3,866,579 | Serruys | February 1975 | 123/25A |
| U.S. Pat. No. 3,911,871 | Williams, et al. | October 1975 | 123/25K |
| U.S. Pat. No. 3,915,669 | Minoza | October 1975 | 48/180C |
| U.S. Pat. No. 4,088,450 | Kosaka, et al. | May 1978 | 23/288L |
| U.S. Pat. No. 4,476,817 | Lindberg | October 1984 | 123/3 |
| U.S. Pat. No. 4,715,325 | Walker | December 1987 | 123/1A |
| U.S. Pat. No. 4,808,287 | Hark | February 1989 | 204/182.5 |
| U.S. Pat. No. 4,960,080 | O'Neill et al. | October 1990 | 123/254 |
| U.S. Pat. No. 5,167,782 | Marlow | December 1992 | 204/168 |
| U.S. Pat. No. 5,464,532 | Nowlin et al. | November 1995 | 210/190 |
| U.S. Pat. No. 5,522,349 | Yoshihara et al. | June 1996 | 123/25C |
| U.S. Pat. No. 5,580,359 | Wright | December 1996 | 44/321 |
| U.S. Pat. No. 5,671,701 | O'Donnell | September 1997 | 123/25A |
| U.S. Pat. No. 6,170,470 | Clarkson et al. | January 2001 | 123/497 |
| U.S. Pat. No. 6,289,853 | Walczak et al. | September 2001 | 123/25R |
| U.S. Pat. No. 6,357,671 | Cewers | March 2002 | 239/102.2 |
| U.S. Pat. No. 6,415,745 | Hellen et al. | July 2002 | 123/25R |
| U.S. Pat. No. 6,698,387 | McFarland, et al. | March 2004 | 123/25A |
| U.S. Pat. No. 6,770,105 | Berlin, et al. | August 2004 | 44/321 |

FIELD OF THE INVENTION

The present invention is an improvement on our referenced U.S. Pat. No. 6,698,387 and relates to internal combustion engines in general and specifically internal combustion engines equipped with water injection and fuel enhancement. In particular the invention relates to an internal combustion engine, having water injected into the intake air stream and having its onboard fuel conditioned to improve overall engine efficiency and to reduce NOx, carbon compounds, particulate matter and other toxic emissions by cooling combustion gases and by effecting a more complete combustion of hydrocarbon fuels.

BACKGROUND OF THE INVENTION

Water and other aqueous solutions have been injected into hydrocarbon-fueled engines by various ways and means to provide improved operation of said engines, emphasizing a variety of benefits. In the majority of embodiments water is used to cool and condense the air in the intake air stream. During the compression stroke, water droplets absorb heat produced from prior combustion, preventing pre-detonation and auto-detonation. During the power stroke water subsequently expands to super-heated steam by the burning fuel mixture, increasing the mechanical efficiency of the combustion process. Benefits may also include scavenging and preventing carbon deposits and varnish in the combustion chamber of said engines, resulting in improved engine performance and decreased abrasion on internal engine surfaces. Water injected engines are generally reported to run more smoothly with less misfiring. Because adding humidity lowers combustion temperature by enthalpy, water injected engines, especially spark-fired engines, can be adjusted to run on a leaner air/fuel mixture, thus conserving natural resources. Most significantly, reduction in peak combustion temperature minimizes the formation of oxides of nitrogen and reduces thermal stress on engine components.

Hydrocarbon fuels, while categorized into different types and grades, are typically agglomerates of a variety of hydrocarbon chain structures, some shorter, some longer. While it is recognized that the longer-chained structures produce more BTU's than the shorter ones, they take more time to burn and because of today's high revolution engines, the longer chains only get partially burned in the combustion process and are emitted as carbon and hydrocarbon pollutants.

Restructuring the hydrocarbon molecules into more uniformly shorter chains will result in a more complete combustion with a net improvement in fuel economy, BTU production, emissions reduction and cleanliness of internal engine surfaces. This restructuring can be accomplished by passive catalysis without adversely affecting lubricity or any other resident characteristic of the particular hydrocarbon fuel being modified. While this is especially applicable to liquid fuels, it is also beneficial for gaseous fuels.

For these reasons we propose a dual system of water injection and fuel conditioning working in tandem to produce a synergistic benefit for an internal combustion engine. We will review the prior art and set forth ways and means to achieve superior results.

U.S. Pat. No. 1,777,554 to Ducloux proposes a canister filled with metal catalysts, some of which are radioactive, through which he passes fuel and the canister is attached to the exhaust manifold of an engine. He reports significant improvement of the hydrocarbon fuel, resulting in increased fuel economy and better performance. Unfortunately, he was apparently unaware of the inherent dangers of human exposure to radioactive elements. U.S. Pat. No. 2,136,170 to Luertzing illustrates the effectiveness of passing liquids through a fine mesh or porous homogeneous media. U.S. Pat. No. 2,231,605 to Stephenson, et al. offers an oxidation catalyst heated by the engine cooling system. This invention, like the one by Ducloux, places large volumes of combustible fuel directly attached to an engine, where any fuel leakage would be easily ignited and pose grave danger to anyone in near proximity. U.S. Pat. No. 3,059,910 to Moriya proposes a magnetic approach to fuel conditioning in which he claims that the fuel molecules are ionized to improve engine performance. U.S. Pat. No. 3,383,560 to Ginsburgh offers a de-ionization method having to do with the safe grounding and neutralizing of high voltage electrical charges in liquids that pass through conductive pipe or tubing. U.S. Pat. No. 3,597,668 to Yoshimine describes a device similar to a capacitor through which fuel is passed to give it an electrical charge and, purportedly, give better fuel performance. This invention and the two preceding inventions assert that adding or removing or aligning electrical charges on fuel molecules causes them to behave differently in the combustion process to produce a cleaner burning more efficient fuel. This phenomenon may prove to be beneficial in some cases, but fuel is also subjected to other electrical and magnetic forces as it passes through its uneven pathway to a combustion chamber which could reverse the ionic effect of such inventions. U.S. Pat. No. 3,866,579 to Serruys sets forth a method to spray variable amounts of water and increase airflow to the intake of an engine to achieve lower NOx emissions. His method lacks adequate control means and is capable of leaving excessive amounts of water in an intake path after engine shutdown. U.S. Pat. No. 3,911,871 to Williams, et al. introduced the idea of using a binary logic processor to control a piezoelectric transducer to achieve ultrasonic vaporization of water inside the intake plenum of an engine in a vehicle. Their vapor device would present numerous problems, both in its installation and subsequent maintenance or repair because of its internal placement and its inadequate control parameters. Additionally, its piezoelectric vibrator would be considerably vulnerable to rapid deterioration due to its intermittent exposure to air. U.S. Pat. No. 3,915,669 to Minoza suggests a vaporizer carburetor which uses exhaust heat to vaporize water and gasoline and release them into the intake air of a vehicle engine for smooth, responsive acceleration and to reduce the heat of combustion. His device would require new engineering for almost every different engine. U.S. Pat. No. 4,088,450 to Kosaka proposes a type of hydrogen reformer to separate hydrogen from hydrocarbon fuel as it passes through a series of oxidation catalysts heated by the exhaust of an engine. This method produces a hydrogen-enriched fuel but the end result is a fuel that is less efficient, therefore more costly to use. U.S. Pat. No. 4,476,817 to Lindberg reports that inducing steam through an ultrasonic device into the air stream of a gasoline-fueled vehicle engine reduces NOx emissions significantly, boosts the engine's power and smoothness of operation and prevents pre-detonation normally associated with the use of lower octane fuel than factory recommendations. He also reported adjusting the engine to run on a leaner air/fuel ratio. His device would also require special engineering for application on different engines. U.S. Pat. No. 4,715,325 to Walker sets forth a multi-catalyst fuel processor that is purported to give emissions reduction and fuel economy. Results vary with these types of devices and a closer observation reveals that the fuel has very little actual contact time with the catalysts. U.S. Pat. No. 5,580,359 to Wright and U.S. Pat. No. 6,770,105 to Berlin, et al. both set forth inventions similar to Walker and the results appear to be similar. U.S. Pat. No. 5,167,782 to Marlow offers a combination of electrical charge plus catalyst, but with similar results to the three aforementioned inventions. U.S. Pat. No. 4,960,080 to O'Neill et al. describes a system for the reduction of NOx emissions for a turbo-diesel generator set by means of a steady flow spray nozzle water injector that is switched on at a pre-determined electrical load and switched off as the load demand falls below that same pre-determined value. His device is very limited in scope and effectiveness under varying conditions. U.S. Pat. No. 5,522,349 to Yoshihara et al. sets forth a water injection system that meters a spray of water into each cylinder of a diesel engine, timed synchronously with fuel injectors to achieve a spray pattern that he purports to be optimal in the abatement of NOx emissions. Their method calls for an entire combustion chamber design change to accommodate both the fuel injection and water injection systems. U.S. Pat. No. 5,671,701 to O'Donnell proposes a cold steam vapor unit for a vehicle engine, oil burner, boiler or hot water heater. The device raises many questions, such as absence of means to control water vapor, water movement issues in a moving vehicle, evaporation issues allowing excess water vapor to flow into the intake manifold of a warm engine after shutdown, etc. U.S. Pat. No. 6,170,470 to Clarkson et al. illustrates a water injection system for disposing of water condensate in a gasoline fuel tank by a series of sensors and valves that monitor and maintain an intermittent water injection system. Their system offers no continuity of benefits, but rather is a method for water disposal in rare instances. U.S. Pat. No. 6,414,745 to Hellen et al. describes a pulsating water injection system for a four-stroke diesel engine, synchronous with the intake stroke of each cylinder. They postulate that this is the most efficacious application of water injection for a diesel engine. Their system calls for an entire combustion chamber design change. U.S. Pat. No. 6,289,853 to Walczak et al. sets forth a water injection system for a marine engine, acquiring water for his system from a fresh or salt-water source in which a marine vessel moves. Their primary concern is setting forth a purification process to supply their water injection application. U.S. Pat. No. 4,808,287 to Hark and U.S. Pat. No. 5,464,532 to Nowlin et al. demonstrate effective means of providing a de-mineralized, ultra-pure water supply by passing it through ion exchange media and reverse osmosis systems. Those experienced in the art will recognize the advisability of employing such means. U.S. Pat. No. 6,357,671 to Cewers sets forth a means of ultrasonic vaporization of liquids. Though other references not cited have set forth numerous ways to vaporize liquids ultrasonically, this one is given as an example of a method that could be used to create an aqueous vapor for a water injection system such as the one described in the present embodiment.

As evidenced by these examples, various types of devices have been developed to induce water or other aqueous solutions into the intake air of internal combustion engines. These methods are not only limited because of their inability to precisely detect and provide means for optimal engine operation but also are incapable of metering a continuously optimized volumetric ratio of water in the final fuel/air charge. Spray or steam injection systems also could damage the turbine blades in a turbocharged engine unless injected downstream from the compressor. Injecting hot steam also has a disadvantage in that it doesn't have as much expansion capability in the power stroke as cool vapor has.

In the event that one of the prior art systems did not completely cut off the water supply before engine shutdown, an accumulation of water in the intake manifold or combustion chamber could result in corrosive and/or mechanical damage to internal engine parts on subsequent start-up or over a protracted period of time. Although this problem is generally recognized as critical to the effective operation of a water injection system, none of the prior art adequately demonstrates fail-safe measures to assure minimal humidity in an intake manifold at engine shutdown.

Most of the prior art expresses a concern about using unpurified water in a water injection system. However, only one of them offers a means for the removal of minerals from the water, which produces scale and corrosion. Walczak, et al. is the only one that does incorporate any means of water demineralization and their only reason for doing so is to be able to use seawater in their marine application. Analysis of water in most parts of the world reveals a mineral content that presents a concern for use in an engine.

Direct injection of water into the combustion chamber presents similar challenges to other methods, but complicates broad application of its technique by requiring highly specialized controls and injectors, precision machining and an individualized system for every engine style. Related art systems have not been entirely successful in satisfying engine requirements, largely due to their inability to respond adequately to a wide range of engine operating conditions.

None of the prior art, except for our previous patent, addresses the monitoring of exhaust gas temperature as a means for continuous precision control of NOx reduction by water injection. Since combustion temperature is the major contributor to the production of oxides of nitrogen, it is essential to introduce an improved method for exhaust temperature measurement and control in order to achieve a more effective NOx control. None of the prior art addresses water vapor injection for emissions control at engine idle speed. When an engine is idling, it may have significant demand from electrical or mechanical systems that cause elevated combustion temperatures that account for significant volumes of NOx emissions, which is of particular concern in urban population areas. Similarly, none of the prior art addresses water vapor injection for engine block temperature control, which can be a major problem in heavy traffic conditions and other circumstances that require extended periods of engine idling. Additionally, none of the prior art addresses the challenge of reducing emissions at engine idle speed when the engine is not warm enough to warrant water injection. This is accomplished by a catalytic fuel conditioner that causes hydrocarbon fuels to burn cleaner and more completely. Prior art uses both heated and non-heated catalysts to affect a positive change in fuels. While it is evident that heating a catalyst to its optimum reaction level can work faster with less catalytic material, the non-heated catalysts also affect the fuel, but there must be more exposure to the catalyst to achieve satisfactory results.

None of the prior art expresses the adaptability of a water vapor system to a wide range of engine operating conditions and applications. A number of sensing and metering devices that monitor engine operating parameters will be discussed herein to optimize water vapor usage in said engine and establish water-to-fuel ratios that respond rationally to the variable operating conditions of an engine.

Neither has any of the prior art utilized the monitoring of boost pressure to control water vapor flow into the intake air stream of a turbocharged engine. The monitoring of a sudden rise, fall or absence of boost pressure can be utilized to increase, decrease or stop the flow of water vapor to more precisely respond to engine operating conditions and give better engine performance and emissions reduction capabilities to said engine.

None of the prior art has combined the use of a fuel-processing device with a water injection device for a synergistic emissions elimination strategy. Though not physically connected, the two devices work in separate streams of the combustion process to contribute to the overall reduction of emissions from said engine.

None of the prior art addresses the issue of preventing said water supply from freezing in cold-weather conditions. Though unrelated to the primary function of a water injection device, freezing temperatures could cause clogging and possible rupture of water-containing lines and vessels, thus disabling said water injection system and rendering it useless.

It is evident that, for the reasons stated, none of the prior art has provided a water injection system with adequate means to achieve significant technical or commercial acceptance.

BRIEF SUMMARY OF THE INVENTION

It is a general objective of this invention to provide a novel method and system for controlling exhaust gas emissions by controlling the temperature and humidity levels in the intake air stream of an internal combustion engine and by catalytically conditioning the hydrocarbon fuel of said engine, which will synergistically reduce harmful emissions, improve performance, increase fuel efficiency and promote longevity of said engine.

More specifically, it is an objective of the present invention to provide a novel and unique hydration system and method by which a cool liquid, namely water or other aqueous solution, can be ultrasonically vaporized and introduced at a measured rate into an engine intake air stream, being activated, de-activated and variably controlled, primarily, in conjunction with the exhaust gas temperature of said engine and, secondarily, in conjunction with the power output levels and operating parameters of said engine, ranging from idle speed to full load conditions. A programmable logic controller or an embedded controller can be programmed to interpret electrical output signals from the intake, exhaust and cooling systems of said engine and to automatically control said hydration system to respond with precision to continuously optimize engine performance and minimize harmful exhaust emissions.

It is a further objective to monitor exhaust gas temperature as a means for continuous precision control of NOx reduction by water injection. Since combustion temperature is the major contributor to the production of oxides of nitrogen, it is essential to introduce an improved method for exhaust temperature measurement and control in order to achieve a more effective NOx control.

A major objective is to establish parameters for the optimum volumetric injection of water-to-fuel ratios in said engine to achieve definitive results in emissions reduction, engine performance and fuel economy.

A primary objective of this invention is to make an emissions control system that is adaptable to a wide range of engine operating conditions and applications and is readily adaptable to a variety of engine types and sizes for both stationary and mobile applications. This is accomplished by a number of sensing and metering devices and a programmed control system that monitors operating parameters for the purpose of optimizing water vapor usage in said engine. This system also monitors and controls its components to maintain adequate water supply, water purity, safe operating temperatures and other system performance levels.

An important objective is to monitor intake manifold air pressure to control water vapor flow into the intake air stream of a turbocharged engine. Monitoring a sudden rise, fall or absence of boost pressure can be utilized to increase, decrease or stop the flow of water vapor to more precisely respond to engine operating conditions and give better engine performance and emissions reduction capabilities to said engine.

A vital objective of this invention is to combine the use of a fuel-conditioning device with a water injection device for a synergistic emissions reduction strategy. Said fuel processor is a passive device containing catalytic metals arranged in such a manner as to cause the fuel to completely and repeatedly come in contact with said catalysts in order to more completely effect the restructuring of said fuel into more uniformly shorter hydrocarbon chains. Catalysts that we have selected and are generally recognized for their effect on hydrocarbon fuels include tin, copper, zinc, iron, nickel, cobalt, silicon, magnesium, molybdenum, platinum, palladium and ruthenium. Chemical reaction can be enhanced by forcing the fuel to pass through multiple stages of catalytic base metals or alloyed metals shaped as porous disks of sintered metal, fine metal mesh, or porous ceramic substrate with chemically reduced catalysts bonded to the surfaces. They are tightly packed and housed in a metal container made of copper, steel or aluminum with ports to allow fluid passage of the fuel.

A crucial objective of this invention is to set forth a means of maintaining said water supply in liquid state during frigid weather conditions. This includes preventing all water-containing components of said water injection system from falling below freezing. Clogging and possible rupture of water-containing lines and vessels can be averted with insulation and line and tank heaters in climates where this presents a problem.

Another objective of this invention is to offer a means of supplemental cooling for an engine that tends to overheat its coolant under heavy load conditions, or, in the case of a loss of engine coolant, to give more time to replace coolant or repair any damage to engine' primary cooling system and to avert damage to internal engine components resulting from overheating. This can be accomplished by said electronic control unit monitoring said engine's coolant temperature and signaling said electronic control unit to inject additional water into the air intake path if coolant temperature rises to near boiling.

An important objective of the present invention is to set forth a novel and unique hydration system that assures the absence of minerals, especially calcium, other dissolved solids and impurities in said water supply, which could be harmful to said hydration system and potentially abrasive or corrosive to said engine. The implementation of current water purification and demineralization technologies can adequately perform this task.

A vitally important objective of the present invention is to offer a means of assuring the complete evacuation of excess humidity from the intake air stream of an engine before allowing a complete shutdown of said engine. Under normal operating conditions a water injection system such as described in the current preferred embodiment would already be automatically disengaged by the time said engine was shut off by the operator. In circumstances where there is not sufficient time for said water injection system to evacuate excess humidity from said intake air stream before engine shutdown, the installation of an interrupt delay in the ignition system of said engine will provide the extra seconds required to accomplish this objective.

The present invention achieves these and other objects by providing a system for regulating the emissions discharge of an engine, whether equipped with a turbocharger compressor or by natural aspiration, whether equipped with a fuel injection system or a carbureted fuel-mixing device, being a prime mover for a variety of working applications. Automatic switching activates said hydration system when said engine is under a load and de-activates said system when said engine is in a no-load status. In a matter of seconds after engine start-up exhaust gas temperature can rise to a level that represents a significant production of NOx, hydrocarbons and particulate matter, which must be controlled.

A thermal probe located in the exhaust path of said engine signals an electronic control unit that said engine exhaust has achieved a pre-determined thermal value that corresponds to a specified emissions level. Other load sensing means can be connected to said electronic control unit and used to regulate water vapor input more precisely. These load sensing means could include a signal from an engine coolant temperature sensor, a barometric/manifold absolute pressure sensor, a throttle position sensor and an ammeter attached to an electrical load of said engine.

The advisability of including sensor devices other than said exhaust thermal probe would take into consideration the operating conditions and performance expectations of said engine as it is used in specific applications. For instance, if an application called for a sudden burst of power, a throttle position sensor or a manifold absolute pressure sensor could trigger a demand for increased water vapor more rapidly than a signal from said thermal probe. An engine coolant temperature sensor could signal a need for water vapor at engine idle speed on a hot day when engine exhaust temperature might not be high enough to activate the vapor system. Also, in a circumstance such as loss of coolant from an engine's cooling system, an extra injection of water vapor could act as a supplemental cooling system to avert damage to the engine to give additional time to remedy the problem. For certain applications, such as a sudden power demand on a generator, a signal from an ammeter could instantly send additional water vapor to the engine faster than a signal from a thermal probe in an engine's exhaust conduit. Though not all applications would require such precise control or quick response, these options should be recognized as means of optimizing engine performance and/or emissions control.

The output of said electronic controller then uses the signals from these sensors to activate an ultrasonic vaporization unit and to achieve an initial level of humidity in the intake air stream. Said ultrasonic unit generates an aqueous vapor from an ultra-pure water supply.

Water lines and vessels can be sleeved with insulating material or equipped with an electrical heating device to prevent ice formation in frigid temperatures. For automatic operation a thermal sensor can detect when the ambient temperature is near freezing and turn on said heating device in order to maintain water lines and vessels above freezing.

In the present embodiment said aqueous vapor is introduced into the intake air downstream from an air-filtering device and a turbocharger when a pre-designated exhaust gas temperature is achieved, and then passes into an intake manifold. In other embodiments said aqueous vapor could be introduced anywhere along an intake air pathway, including being injected directly into the combustion chamber of an engine. As engine exhaust temperature rises due to increased load or higher ambient temperature or lower ambient relative humidity, control unit initiates and increases the quantity of said aqueous vapor to counteract increasing emissions and to maintain smooth operation of said engine. Lower exhaust temperature indicates less or no load, so a thermal sensor in the exhaust conduit signals the control unit to reduce the amount of water vapor until the point where the temperature is low enough that no water vapor is needed. A sudden deceleration of engine speed can reduce intake manifold air pressure to zero. Under these circumstances no water vapor is needed, so at very low manifold pressure an electronic transducer in the manifold signals the control unit to stop water vapor until manifold pressure rises again and the control unit resumes injection of water vapor. A sudden acceleration of engine speed creates a sudden demand for additional water vapor. Because a throttle position sensor or rack sensor receives and sends an acceleration signal within milliseconds, the signal can be received by said control unit and instantly inject an increased volume of water vapor to accommodate the sudden load increase and thus prevent excess emissions.

In this constantly changing environment water-to-fuel ratios can fluctuate between 0:1 in no load, low emissions situations and elevate to a 1:1 ratio in maximum load state. Water consumption will increase in proportion to a rise in engine speed, engine load, exhaust temperature and under full throttle. The maximum volume of water vapor would be required only under extreme load conditions.

In the preferred embodiment a catalytic fuel conditioner will cause hydrocarbon fuels to burn more completely. Heating the catalyst to 300° F. or hotter would increase reactivity, but there is little benefit in cracking the fuel to cause hydrogen off-gassing. A preferable goal would be to homogenize the fuel into shorter, more uniform HC chains in the catalytic process to derive the maximum benefit from the fuel. This can be accomplished at ambient temperature levels but this method requires that more catalyst surface area be exposed in order to thoroughly and repeatedly contact the fuel. There are economical processes for achieving this effect and the catalyst, of course, would not be consumed or poisoned. The following catalysts are set forth as a multi-staged process and each individual stage may be composed of one or more of these catalysts by volume: Copper 30–100%; Zinc 30–100%; Iron 30–100%; Tin 30–100%; Silicon 30–100%; Nickel 30–45%; Cobalt 10–40%; Magnesium 10–40%; Molybdenum 10–100%; Platinum 10–100%; Palladium 10–100%; Ruthenium 10–100%.

The resulting system is both reliable and cost-effective, and is readily adaptable to a variety of engine types and sizes by increasing or decreasing the aqueous vapor relative to the full range of exhaust temperatures imposed by the output load of an engine.

Each of these illustrations demonstrates a possible configuration of the various components of the current invention, not being limited to the configurations herein presented, but these are set forth as a sampling of the numerous applications wherein the invention would benefit the operation of a wide variety of internal combustion engine configurations and applications.

DETAILED DESCRIPTION OF THE INVENTION

Figure 1:
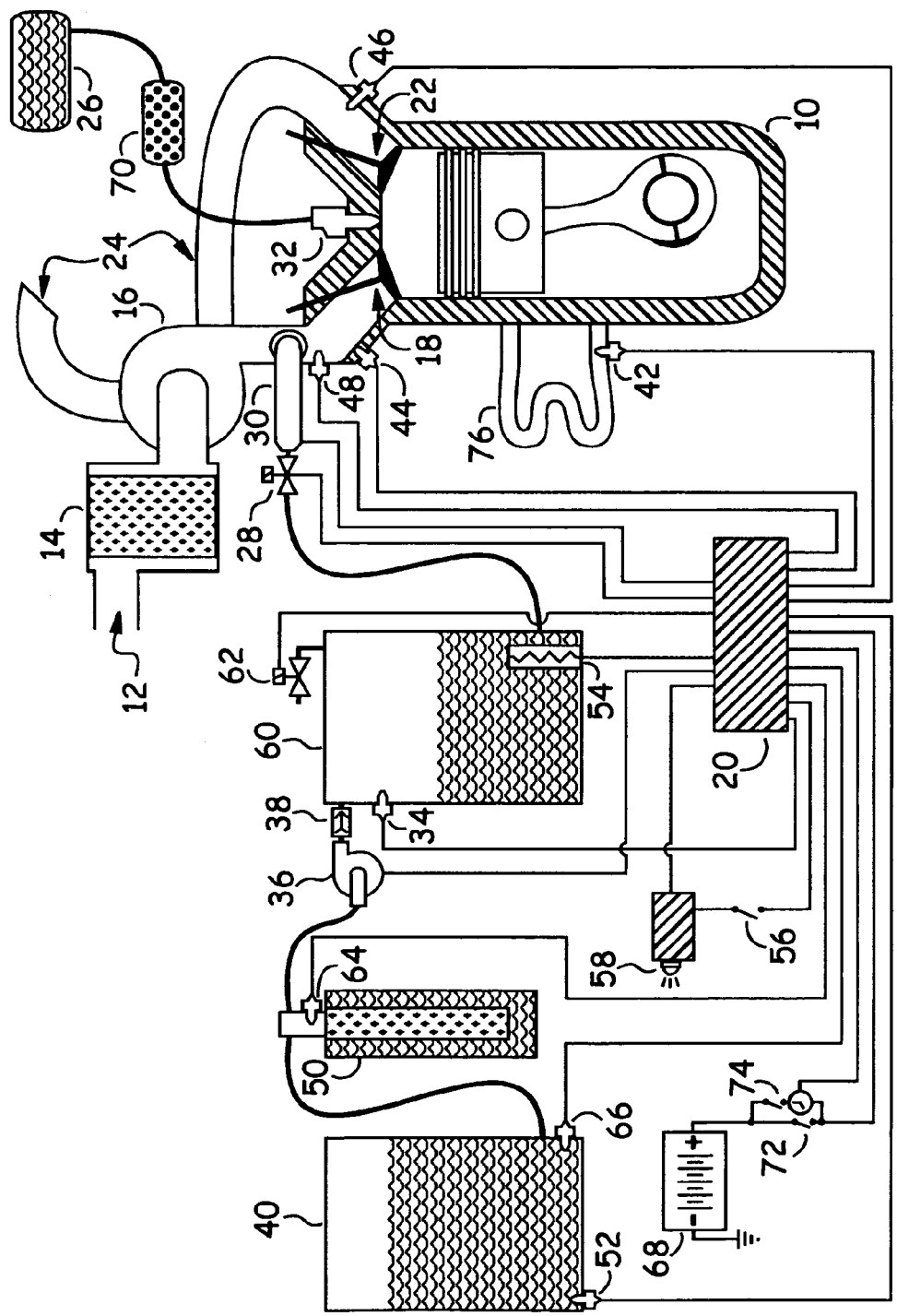
FIG. 1 depicts a water injection engine having a water purification system and then ultrasonically converts said ultra-pure water from a liquid state to a vapor, introducing it into the air intake stream of an internal combustion engine downstream from a turbocharger, having said system activated, de-activated and controlled by electronically monitoring engine exhaust gas temperature, coolant temperature, throttle position and manifold air pressure and being controlled by a microprocessor. A catalytic fuel conditioner and a fuel supply are also illustrated.

The FIG. 1 drawing depicts a piston engine 10, equipped with an air intake housing 12, containing an air filtering device 14, connected to a turbocharger compressor 16 that sends compressed air to an air intake port 18, having an exhaust port 22 and an exhaust system path 24 for the dispersion of combustion gases expelled by said engine 10. Said engine 10 is started by switching power to engine ignition system 72, connected to a DC power supply 68. An electronic control module 20 is powered on at engine start-up and begins to monitor all system sensors: (42, 44, 46, 48, 52 and 66). Simultaneously, as fuel enters said engine 10 through a fuel delivery system 32, said fuel passes from a fuel supply tank 26 and through a catalytic fuel conditioning unit 70 before being consumed by said engine 10. When said engine 10 is under a load, a thermal sensor 46 near said exhaust port 22 signals a valve 62 to close and a valve 28 to open and a pressurizing means 36 transfers water from said holding tank 60 to an ultrasonic vaporization unit 30 where said ultra-pure water vapor is injected into said air intake port 18 and consumed by said engine 10. A water supply reservoir 40 contains water of unspecified purity and quantity. A liquid level sensor 66 monitors the volume of water in said water supply reservoir 40. A pressurizing means 36 transfers water through an ultra-purity demineralization means 50 and deposits it into a variably pressurized holding tank 60. A pressure monitoring sensor 34 signals said electronic control module to engage or disengage a pressurizing means 36 for maintaining a specified pressure range in said holding tank 60. A check valve 38 prevents the backward flow of water after it is deposited into said holding tank 60. A water impurities sensor 64 signals said electronic control module 20 when it detects the presence of minerals in said ultra-pure water supply and activates an annunciator 58 to alert engine operator that ultra-purity demineralization means 50 needs maintenance. Said thermal sensor 46 monitors exhaust gas temperature and when said exhaust gas temperature attains a specified level, an electronic control module 20 initializes said ultrasonic vaporization unit 30, producing an aqueous vapor that is injected into said air intake port 18 of said engine 10. Combustion gases are expelled through said exhaust port 22 and as exhaust gas temperature increases, said thermal sensor 46 signals said ultrasonic vaporization unit 30 to produce more aqueous vapor. Any desired volume of aqueous vapor may be produced in conjunction with exhaust temperature rise. Whenever said engine 10 decelerates to a prescribed low level of manifold pressure, a pressure sensor 48 signals said electronic control module 20 to close said valve 28 to temporarily stop the flow of water vapor from said ultrasonic vaporization unit 30 until manifold pressure rises to a prescribed level and said electronic control module 20 sends a signal to open said valve 28 to resume the flow of water vapor. If engine operator should require a sudden increase of power from said engine 10 and makes a demand on said engine 10 to exert maximum power, a sensor 44 will alert said electronic control module 20 to pressurize said holding tank 60 to maximum pressure for a vapor-assisted acceleration. A backing off of maximum power demand will return holding tank 60 to its normal exhaust temperature controlled operating pressure. If engine coolant temperature in engine's primary cooling system 76 should rise to a near boiling point, a thermal sensor 42 will activate a supplemental cooling by signaling said electronic control module 20 to temporarily pressurize said holding tank 60 to maximum pressure for injection of additional water vapor to lower engine operating temperature and allow some extra time for operator to shut down said engine 10 so said engine's primary cooling system 76 can be serviced. As said thermal sensor 46 indicates a decrease in exhaust gas temperature, the volume of aqueous vapor is concurrently decreased until exhaust gas temperature is low enough to signal an interrupt of said ultrasonic vaporization unit 30, which actuates a shut-off valve 28 and relieves pressure from said holding tank 60. Should operator disconnect engine ignition system 72 before prescribed minimum exhaust temperature is low enough to signal an interrupt of said ultrasonic vaporization unit 30, said electronic control module 20 will initiate a time delay switch 74 to keep engine running for a prescribed timeframe to allow excess water to exit said engine 10. If at any time a thermal sensor 52 registers a near-freezing temperature, a heating element 54 is turned on to warm up water to prevent said water from freezing. One or more annunciators 58 indicate functionality of system parameters. A manual override system switch 56 can be used by engine operator to disable vaporization system, if so desired. Otherwise, system is totally automated.

Figure 2:
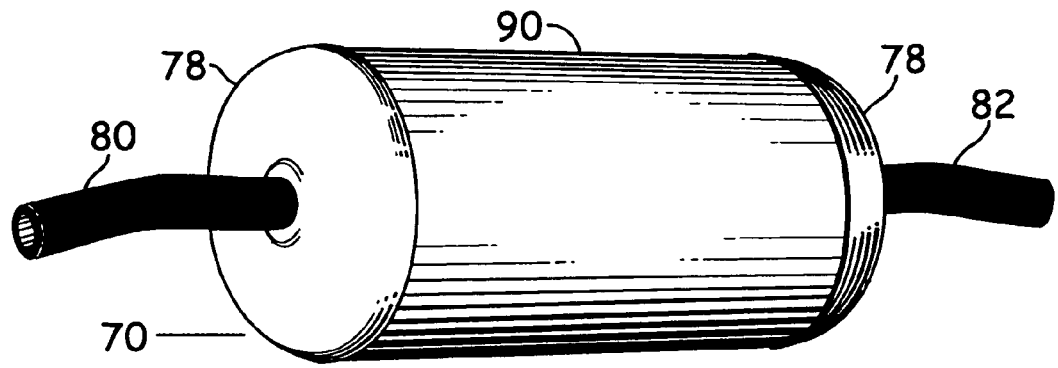
FIG. 2 illustrates a preferred embodiment of the external appearance of a catalytic fuel-conditioning unit.

The FIG. 2 drawing depicts the exterior of said catalytic fuel conditioning unit 70. A fuel in port 80 connects a fuel supply tank 26 to said catalytic fuel conditioning unit 70 and a fuel out port 82 connects said catalytic fuel conditioning unit 70 to a fuel delivery system 32 for said engine 10. A cylindrical body 90 and two end caps 78 are hermetically sealed to form a monolithic structure to be secured at a convenient point between said fuel supply tank 26 and said engine 10.

Figure 3:
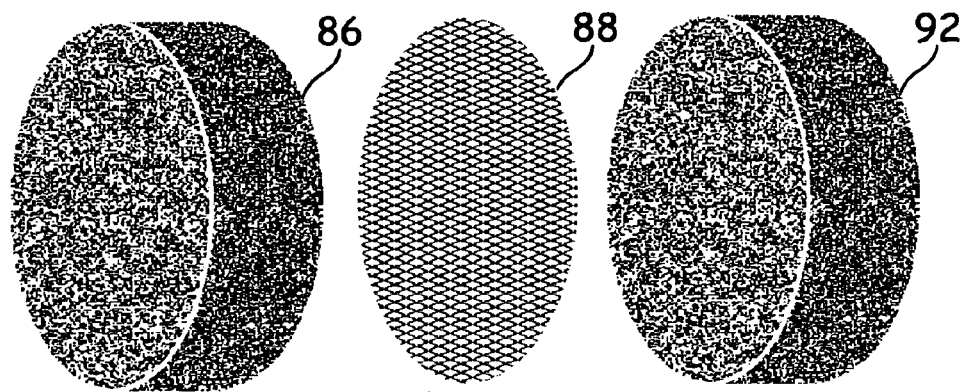
FIG. 3 shows separate internal components of a catalytic fuel-conditioning unit and FIG. 4 is a cross-section of the components of a multi-staged catalytic fuel-conditioning unit.

The FIG. 3 drawing shows three internal components of said fuel conditioning unit 70. A spherical porous catalytic segment 86 is separated from another spherical porous catalytic segment 92 by a spherical metallic mesh 88 in a series of differing catalytic processing stages as hydrocarbon fuel is passed through the various stages. Spherical catalytic segments 86 and 92 can be ground up solid base metals or alloys and pressed into a sintered porous block or chemically reduced and bonded to a ceramic porous substrate.

Figure 4:
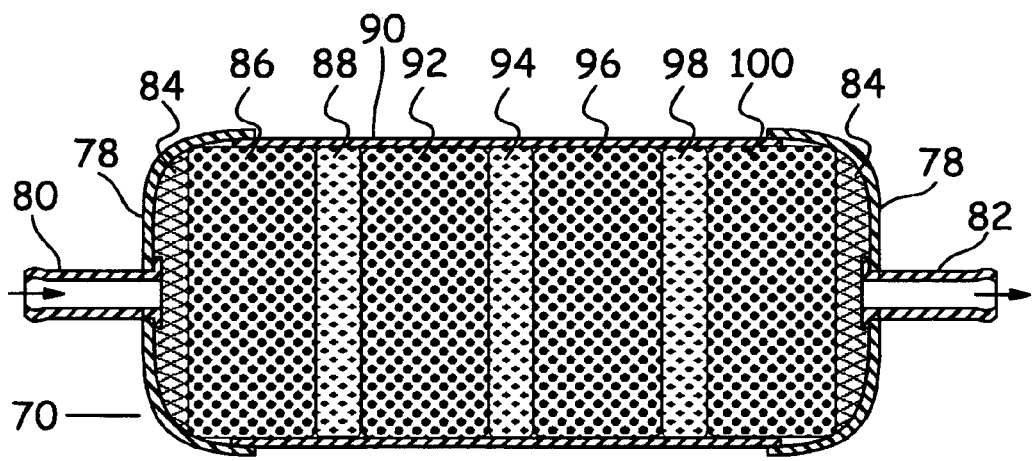

The FIG. 4 drawing is a cross-section of a catalytic fuel conditioning unit 70. As fuel passes from a fuel supply tank 26 it enters by a fuel in port 80 and through a fibrous filter media 84 into a larger body comprised of two end caps 78 and a cylindrical body 90 and filled with a series of catalytic segments 86, 92, 96, 100, alternately stacked and separated by spherical metallic mesh 88, 94, 98, and through a fibrous filter media 84 and passes through a fuel out port 82 on its way to a fuel delivery system 32 in fluid connection with said engine 10.

What the inventors claim is:

1. A water injection engine comprising:
  a) an internal combustion engine having at least one combustion chamber, having at least one reciprocating piston, having a cylinder head, having at least one intake port and having at least one exhaust port with at least one exhaust conduit;
  b) an air intake path, having an air filtering system and an air mixing system, directing a charge of air into said air intake port;
  c) an exhaust path, having said exhaust port connected to said exhaust conduit for the expulsion of exhaust gases from said engine;
  d) a water injection system for containing an ultra-pure water supply in fluid connection with vessels, valves, purification means, pressurizing means, control means and vaporization means in fluid connection with said air intake path of said engine;
  e) a holding tank for receiving said ultra-pure water supply in fluid connection with a solenoid valve for the purpose of open/closed control of said holding tank, a liquid level sensor for the purpose of alerting operator to maintain supply of said ultra-pure water supply and a pressurizing means being electrically controlled for the purpose of variable pressure and volumetric control of said ultra-pure water supply;
  f) at least one ultrasonic vaporization unit in fluid connection with said holding tank to create an aqueous vapor to be injected into said air intake path;
  g) a housing containing said ultrasonic vaporization unit connected to said air intake port for mixing said vapor with said intake air charge of said internal combustion engine;
  h) at least one electronic control unit for the purpose of monitoring and controlling functions of said water injection engine which pertain to the operation of said ultrasonic vaporization unit, including at least the monitoring of exhaust gas temperature, intake manifold pressure, accelerator position, liquid level of said ultra-pure water supply, pressure of said holding tank and which unit also controls said ultrasonic vaporization unit including on/off control and variable pressure control and being electrically connected to a DC power source;
  i) at least one catalytic fuel-conditioning unit in fluid connection with said fuel supply of said engine and also in fluid connection with said combustion system of said engine and containing base metal catalysts and metal alloyed catalysts for restructuring said fuel.

2. A water injection system for an internal combustion engine, as in claim 1, having at least one ultrasonic vaporization unit electrically connected to said electronic control unit that engages, disengages and manages said injection of ultra-pure vaporized water into said air intake path of said engine at a prescribed rate.

3. An electronic control unit, as in claim 2, that injects ultra-pure vaporized water into said air intake path of said engine at a ratio between 0:1 water/fuel ratio to 1:1 water/fuel ratio.

4. An electronic control unit, as in claim 2, that injects ultra-pure vaporized water into said air intake path of said engine, being activated, de-activated and variably controlled primarily in conjunction with the exhaust gas temperature of said engine.

5. An electronic control unit, as in claim 4, having electrical connection with at least one electronic thermal sensor with its probe exposed to said exhaust path within close proximity of said exhaust port, capable of sending a signal to said electronic control unit that measures exhaust temperature from said engine.

6. An electronic control unit, as in claim 2, that injects ultra-pure vaporized water into said air intake path of said engine, being activated, de-activated and variably controlled in conjunction with the intake manifold air pressure of said engine.

7. An electronic control unit, as in claim 6, having electrical connection with at least one electronic pressure transducer inserted into said intake air path within close proximity of said air intake port, capable of sending a signal to said electronic control unit that measures air pressure in said air mixing chamber connected to said air intake port.

8. An electronic control unit, as in claim 2, that injects ultra-pure vaporized water into said air intake path of said engine, which has as an optional feature, a quick response vapor injection feature, being activated, de-activated and variably controlled in conjunction with the accelerator or throttle position of said engine.

9. An electronic control unit, as in claim 8, having electrical connection with at least one electronic sensor that detects acceleration and deceleration of said engine.

10. An electronic control unit, as in claim 2, that injects ultra-pure vaporized water into said air intake path of said engine, which has as an optional feature, a heating system that monitors the temperature of said ultra-pure water supply of said water injection system for detection of near-freezing temperatures.

11. An electronic control unit, as in claim 10, which has as an optional feature, a heating system, having electrical connection with at least one electronic sensor that detects near-freezing temperatures in said ultra-pure water supply.

12. An electronic control unit, as in claim 10, which has as an optional feature, a heating system, having electrical connection with at least one electric heating element that is in physical contact with said ultra-pure water supply and is caused to activate when temperatures drop to near-freezing to prevent ice in said ultra-pure water supply.

13. A water injection system for an internal combustion engine, as in claim 1, having at least one ultrasonic vaporization unit electrically connected to said electronic control unit that injects ultra-pure vaporized water into said air intake path of said engine, having a purification means for supplying said ultra-pure water in fluid connection with said ultrasonic vaporization unit.

14. An electronic control unit, as in claim 2, that injects ultra-pure vaporized water into said air intake path of said engine, being activated, de-activated and variably controlled by internal programming that electronically senses limits, levels and times and that monitors and controls components of said water injection system according to a prescribed program.

15. An electronic control unit, as in claim 14, that injects ultra-pure vaporized water into said air intake path of said engine, being activated, de-activated and variably controlled by internal programming that electronically senses limits, levels and times and that detects impurities such as minerals or acids in said water supply and activates an alarm that alerts an engine operator to replace said purification means and thereby prevent impurities from passing into said engine.

16. An electronic control unit, as in claim 15, electrically connected to at least one electronic sensor that detects impurities in said water supply and will shut down said water injection system if not serviced within a prescribed timeframe.

17. An electronic control unit, as in claim 14, that injects ultra-pure vaporized water into said air intake path of said engine, being activated, de-activated and variably controlled by internal programming that electronically senses limits, levels and times and that detects low levels in said ultra-pure water supply and activates an alarm that alerts an engine operator to add more water to prevent said water injection system from shutting down.

18. An electronic control unit, as in claim 17, electrically connected to at least one electronic sensor that detects low water levels in said ultra-pure water supply and will shut down said water injection system if not serviced within a prescribed timeframe.

19. An electronic control unit, as in claim 14, that injects ultra-pure vaporized water into said air intake path of said engine, being activated, de-activated and variably controlled by internal programming that electronically senses limits, levels and times and that prevents said engine from shutting down until said water injection system has had ample time to shut off and clear water vapor from said air intake path by.

20. An electronic control unit, as in claim 19, electrically connected as an ignition system bypass circuit to the ignition system of said engine and that causes said ignition system to remain engaged and keep said engine running for a prescribed timeframe to allow water vapor to clear from said air intake path.

21. An electronic control unit, as in claim 2, that injects ultra-pure vaporized water into said air intake path of said engine, which has as an optional feature, a supplemental engine cooling system that prevents said engine's coolant from boiling over by electronically sensing the near-boiling temperature of said engine's primary cooling system and activating said water injection system until said primary cooling system can be returned to a safe operating temperature.

22. An electronic control unit, as in claim 21, which has as an optional feature, a supplemental engine cooling system, electrically connected to at least one electronic sensor in physical contact with said engine coolant and that is capable of detecting near-boiling temperatures in said engine's primary cooling system.

23. An electronic control unit, as in claim 2, that injects ultra-pure vaporized water into said air intake path of said engine, being activated, de-activated and variably controlled by internal programming that electronically senses limits, levels and times and which has as an optional feature, a control parameter which is the engine output load as indicated by an ammeter electrically connected to an electric generator connected to said engine.

24. A water injection system for an internal combustion engine, as in claim 1, having at least one ultrasonic vaporization unit electrically connected to an electronic control unit that injects ultra-pure vaporized water into said air intake path of said engine and having at least one containerized catalytic fuel-conditioning unit in fluid connection with said fuel supply and with said combustion system of said engine, which passively enhances said hydrocarbon fuel for said engine as said fuel flows through said catalytic fuel-conditioning unit.

25. A catalytic fuel-conditioning unit, as in claim 24, having a plurality of catalytic stages, each stage consisting of a base metal catalyst or alloyed metal catalyst being comprised of at least one the following elements: tin, copper, zinc, iron, nickel, cobalt, silicon, magnesium, molybdenum, platinum, palladium and ruthenium or a combination of these.

26. A catalytic fuel-conditioning unit, as in claim 24, having a plurality of catalytic stages, each stage consisting of a base metal catalyst or alloyed-metal catalyst being comprised quantitatively of at least one of the following elements:
  a) Copper 30–100%; b) Zinc 30–100%; c) Iron 30–100%;
  d) Tin 30–100%;
  e) Silicon 30–100%; f) Nickel 30–45%; g) Cobalt 10–40%; h) Magnesium 10–40%;

i) Molybdenum 10–100%; j) Platinum 10–100%; k) Palladium 10–100%;
l) Ruthenium 10–100%.

27. A catalytic fuel-conditioning unit, as in claim 24, having a plurality of catalytic stages, each stage consisting of a base metal catalyst or alloyed-metal catalyst being finely ground and compressed to conform to a prescribed shape with sufficient porosity as to not inhibit fuel flow, but having direct and repeated contact with totality of said fuel.

28. A catalytic fuel-conditioning unit, as in claim 24, having a plurality of catalytic stages, each stage consisting of a base metal catalyst or alloyed-metal catalyst being chemically reduced and bonded to a porous silicon substrate with sufficient porosity as to not inhibit fuel flow, but having direct and repeated contact with totality of said fuel.

29. A catalytic fuel-conditioning unit, as in claim 24, having a plurality of catalytic stages, having a sealed metal housing made of steel, copper or aluminum and having at least one in port and at least one out port in fluid connection with a fuel supply line for said internal combustion engine.

* * * * *